No. 744,136. PATENTED NOV. 17, 1903.
J. WALDBROOK.
DRIVE OR MASTER WHEEL DIVIDER FOR HARVESTER BINDERS.
APPLICATION FILED DEC. 26, 1902.
NO MODEL.
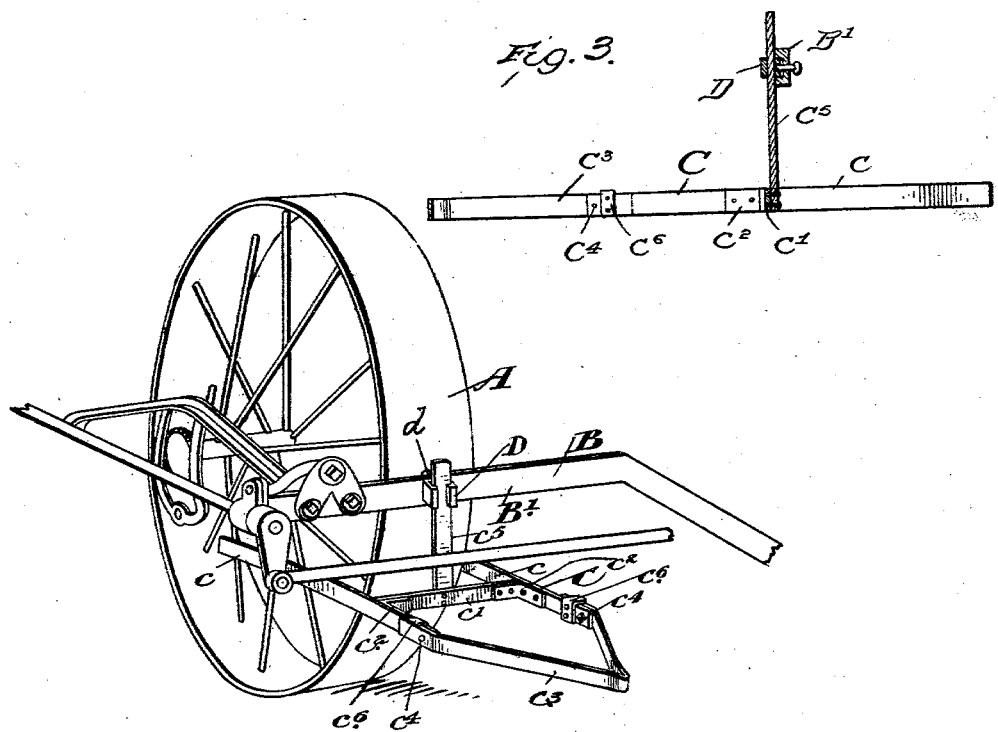
Fig. 3.
Fig. 1.
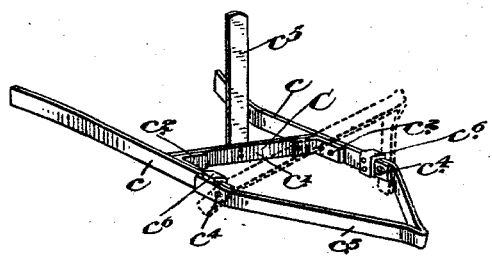
Fig. 2.
Witnesses.
Inventor.
James Waldbrook.

No. 744,136. Patented November 17, 1903.

UNITED STATES PATENT OFFICE.

JAMES WALDBROOK, OF OAKVILLE, CANADA.

DRIVE OR MASTER WHEEL DIVIDER FOR HARVESTER-BINDERS.

SPECIFICATION forming part of Letters Patent No. 744,136, dated November 17, 1903.

Application filed December 26, 1902. Serial No. 136,664. (No model.)

*To all whom it may concern:*

Be it known that I, JAMES WALDBROOK, farmer, of the town of Oakville, in the county of Halton, in the Province of Ontario, Canada, have invented certain new and useful Improvements in Drive or Master Wheel Dividers for Harvester - Binders, of which the following is the specification.

My invention relates to improvements in drive or master wheel dividers for harvester-binders; and the object of the invention is to provide a simple divider to be used in front of the main wheel or master-wheel which will divide the standing grain (when the machine is first put into the field) before the wheel reaches it, and thereby prevent the crushing and shelling of the same; and a subsidiary object is to dispense with the tilting of the binder to raise the depressed grain, and thereby provide against any increased draft on the machine or the sinking of the ledger-plate and knife in the soil and the consequent wearing of the same.

Heretofore when a binder was driven through standing grain in beginning to cut the main wheel would pass onto the standing grain and throw it down or depress it, and consequently on passing the machine over this depressed grain the knife would not be in a position to cut the grain over which the main wheel had passed, and the machine had consequently to be tilted, so as to depress the knife and ledger-plate so that they would lie close to the ground and lift the grain and cut it. From being so depressed the knife and ledger-plate would frequently become worn on account of contact with the soil and stones, and it was with the object of providing against these serious defects that my invention was particularly designed.

Figure 1 is a perspective view showing the main or master wheel and portion of the frame thereof and my attachment connected thereto. Fig. 2 is a perspective detail of the attachment separated. Fig. 3 is a detail sectional view.

In the drawings like letters of reference indicate corresponding parts in each figure.

A is the main wheel of the binder, and B a portion of the frame thereof, and B' the cross-bar of such portion, which extends in front of the main wheel.

C is my divider, which comprises the side bars $c$, with flaring rear ends, the cross-bar $c'$, connected thereto by suitable angle-brackets $c^2$, the V-shape or pointed bar $c^3$, forming the divider proper, which is pivoted on the bolts $c^4$ in front of the bars $c$, and the upright $c^5$, which is secured to the center of the cross-bar $c'$. The pointed or V-shaped bar $c^3$ is held in the horizontal position by the brackets $c^6$, which are secured to the side bars $c$ and overhang the inner ends of the bar $c^3$. The upright $c^5$ extends through a grooved bracket D, which is secured to the bar B', such upright being vertically adjustable in such grooved bracket and being held in any suitable position by a set-screw $d$, which extends through the bar B' and the bracket.

It will be seen from the construction which I have now described that the front or pointed end of the bar $c^3$ will as the main wheel is drawn forward serve to part or divide the grain, so as to throw it to each side of the main wheel, and thereby prevent it from being depressed and crushed. It will also be seen that on account of the divider being hinged, as shown, if it meets with any obstruction on the ground the front or pointed end will rise and ride over such obstruction and as soon as it has passed the same such divider will assume its normal position.

What I claim as my invention is—

1. In combination, a frame, a divider comprising side bars, having converging front portions pivotally connected to the side bars and means for connecting the divider with the frame, and for adjusting the said divider vertically as a whole, substantially as described.

2. In combination, the frame, a divider comprising side bars arranged horizontally and converging front portions pivoted to the horizontal bars and free to rise on their pivots, and means for limiting the downward movement of the converging front portions in relation to the horizontal bars, substantially as described.

3. In a harvester-binder, the combination with the main or master wheel and the frame thereof, of a divider suitably held on the frame in front of the main wheel and substantially parallel to the ground and means for vertically adjusting the divider as a whole on the frame in relation to the ground while maintaining its parallel relation thereto as and for the purpose specified.

4. In a harvester-binder, the combination with the main or master wheel and frame thereof, of a divider comprising side bars converging to a point at the front, a cross-bar connecting the side bars and the upright connected to the cross-bar, and a grooved bracket through which the upright extends and a set-screw for holding it in position in the grooved bracket as and for the purpose specified.

5. In a harvester-binder, the combination with the main or master wheel and frame, of a divider comprising the side bars and a cross-bar and the upright, and the V-shape divider-bar, and limiting-stops secured to the side bars over the rear ends of the divider-bar and means for holding such divider on the frame as and for the purpose specified.

JAS. WALDBROOK.

Witnesses:
B. BOYD,
M. McLAREN.